US010793321B2

(12) United States Patent
Reid (10) Patent No.: US 10,793,321 B2
(45) Date of Patent: Oct. 6, 2020

(54) APPARATUS AND METHODS FOR HOLDING A THIN FLEXIBLE MATERIAL

(71) Applicant: Lisa J Reid, Portland, OR (US)

(72) Inventor: Lisa J Reid, Portland, OR (US)

(73) Assignee: Lisa Reid, Milwaukie, OR (US)

( * ) Notice: Subject to any disclaimer, the term of this patent is extended or adjusted under 35 U.S.C. 154(b) by 0 days.

(21) Appl. No.: 15/710,444

(22) Filed: Sep. 20, 2017

(65) Prior Publication Data

US 2019/0185214 A1    Jun. 20, 2019

(51) Int. Cl.
*B65D 33/14* (2006.01)
*B65F 1/14* (2006.01)
*F16M 13/02* (2006.01)

(52) U.S. Cl.
CPC ............ *B65D 33/14* (2013.01); *B65F 1/1415* (2013.01); *F16M 13/022* (2013.01)

(58) Field of Classification Search
CPC ...... B65F 1/06; B65F 2001/061; B65F 1/062; B65F 1/068; B65F 1/1415
See application file for complete search history.

(56) References Cited

U.S. PATENT DOCUMENTS

| | | | | |
|---|---|---|---|---|
| 4,735,340 A | * | 4/1988 | Preston | B65F 1/06 220/495.1 |
| 4,886,173 A | * | 12/1989 | Goulter | A47F 13/085 211/89.01 |
| 4,923,087 A | * | 5/1990 | Burrows | B65F 1/06 220/495.1 |
| 5,090,585 A | * | 2/1992 | Power | B65F 1/062 220/495.04 |
| 5,261,553 A | * | 11/1993 | Mueller | B65F 1/06 220/495.1 |
| 5,419,452 A | * | 5/1995 | Mueller | B65F 1/06 220/495.08 |
| 7,243,811 B1 | * | 7/2007 | Ramsey | B65F 1/06 220/495.08 |
| 8,672,171 B2 | * | 3/2014 | Wynn | B65F 1/06 220/495.08 |
| 2016/0318455 A1 | * | 11/2016 | Zhang | F16M 11/105 |

* cited by examiner

*Primary Examiner* — Shawn M Braden (57) ABSTRACT

An apparatus for securely holding a flexible material has a first securing member has a first outer circumference and a first shape, and a second securing member having a second inner circumference and a second shape Wherein the second inner circumference is about the same size, or slightly smaller than, the first member's first outer circumference, such that the second member positioned upon the first member creates static friction between the first outer circumference and the second inner circumference. The apparatus has a backing support that is in physical connection with, or incorporated as part of, either the first member or the second member. A thin flexible material, such as a plastic waste bag, placed between the first member and the second member is secured by positioning the first member and second member together, the positioning and static friction not shearing the flexible material. The static friction between the first outer circumference and the second inner circumference secures and immobilizes the thin flexible material contained within.

18 Claims, 6 Drawing Sheets

APPARATUS AND METHODS FOR HOLDING A THIN FLEXIBLE MATERIAL

TECHNICAL FIELD OF THE DISCLOSURE

The present disclosure relates in general to holding flexible materials. This application relates in particular to securely holding flexible materials such as plastic bags, clothe, mesh bags, and other such receptacles.

BACKGROUND DISCUSSION

A variety of solutions exist to securing thin flexible materials such as waste bags. Waste bags for instance can be held with rigid receptacles, the waste bags lining the receptacles. Mounted hooks that attached to drawers have extended hooks or rectangular openings to hold either bag loop handles or the perimeter of the bag in an attempt to keep bags open and accessible. This application relates to another approach.

SUMMARY OF THE DISCLOSURE

The present disclosure is directed to an apparatus and methods for securely holding a flexible material. In one aspect the apparatus has a first securing member having an outer circumference and a first shape. The apparatus has a second securing member having an inner circumference and a second shape, wherein the inner circumference is about the same size, or slightly smaller than, the first member's outer circumference, such that the second member positioned upon the first member creates static friction between the outer circumference and the inner circumference. A backing support is in physical connection with, or incorporated as part of, either the first member or the second member. A thin flexible material placed between the first member and the second member is secured by positioning the first member and second member together, the positioning and static friction not shearing the flexible material. Static friction between the first outer circumference and the second inner circumference secures and immobilizes the thin flexible material.

BRIEF DESCRIPTION OF THE DRAWINGS

The accompanying drawings, which are incorporated in and constitute a part of the specification, schematically illustrate embodiments of the present disclosure, and together with the general description given above and the detailed description of preferred methods and embodiment given below, serve to explain principles of the present disclosure.

FIG. 1A is a perspective view of an apparatus of the present disclosure for securely holding a flexible material comprising: a first securing member having a outer circumference and a first shape, a second securing member having a inner circumference and a second shape, wherein the inner circumference is about the same size, or slightly smaller than, the first member's outer circumference, such that the second member positioned upon the first member creates static friction between the first outer circumference and the second inner circumference; a backing support that is in physical connection with, or incorporated as part of, either the first member or the second member; wherein a thin flexible material placed between the first member and the second member is secured by positioning the first member and second member together, the positioning and static friction not shearing the flexible material; and wherein the static friction between the first outer circumference and the second inner circumference secures and immobilizes the thin flexible material contained within.

DETAILED DESCRIPTION

Referring now to the drawings, wherein like components are designated by like reference numerals. Methods of manufacture and various embodiments of the present disclosure are described further herein below.

Figure 1A:
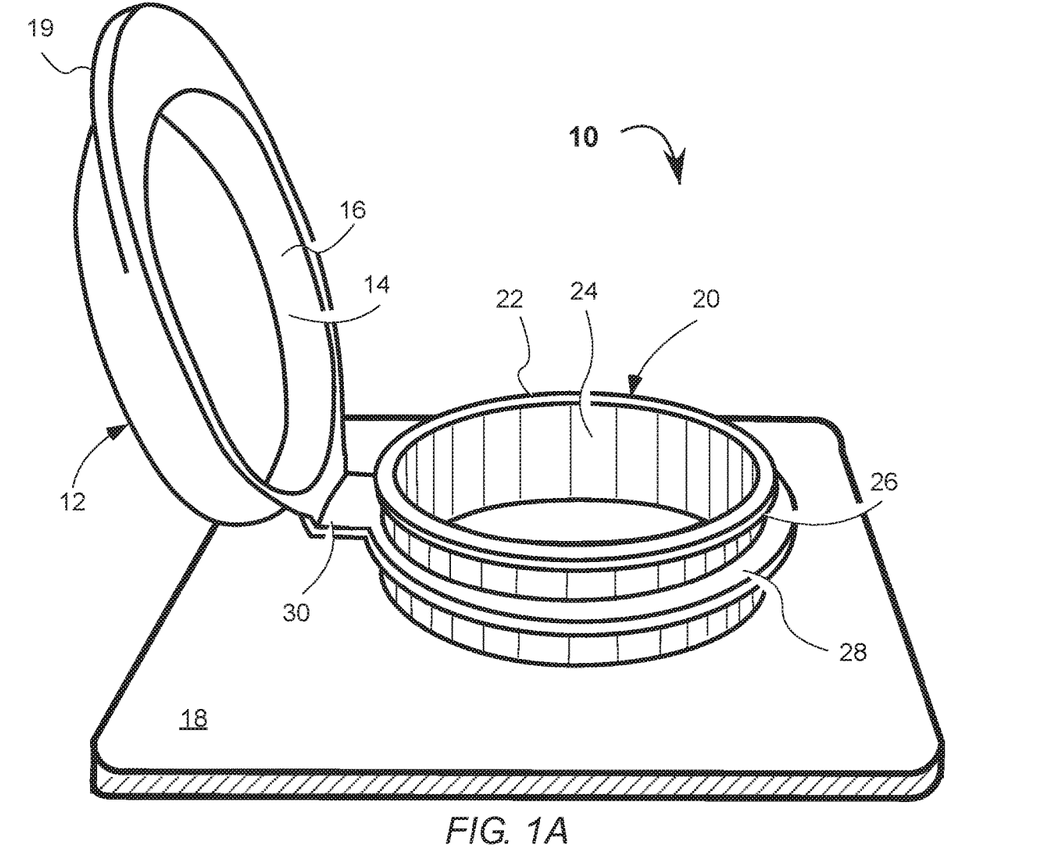
FIG. 1B is a partial cross-section view of that seen in FIG. 1A providing further detail of the first member and the second member.
Figure 1B:
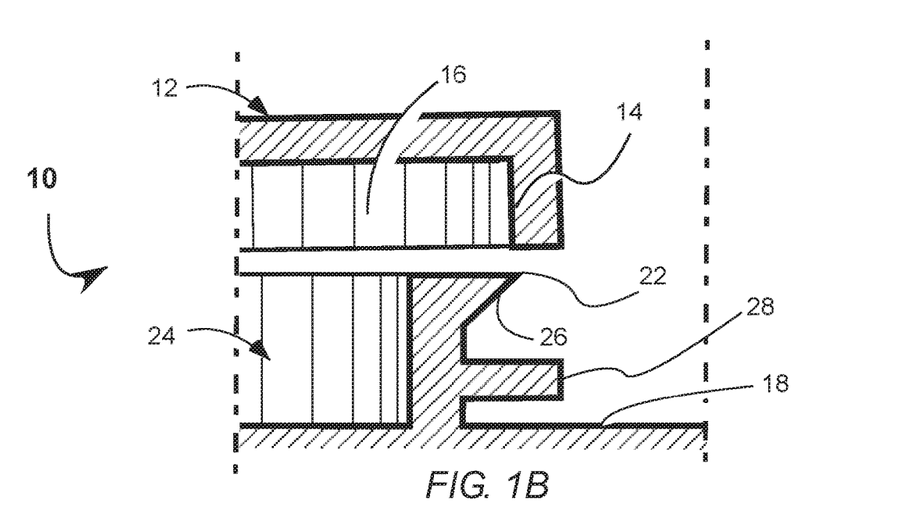

Referring to FIGS. 1A and 1B, an apparatus 10 for securely holding a flexible material, such as a waste bag, comprises a first securing member 12 having a outer circumference 14 and a first shape, a second securing member 20 having a inner circumference 22 and a second shape, wherein inner circumference 22 is about the same size, or slightly larger than, first securing member's 12 outer circumference 14, such that second member 20 positioned upon first member 12 creates static friction between outer circumference 14 and inner circumference 22. A backing support 18 is in physical connection with second securing member 20.

Operationally, a thin flexible material is placed between the first securing member and the second securing member. Positioning the first securing member and the second securing member, with the thin flexible material between creates static friction that immobilizes the thin flexible material, without shearing it. In some cases, the thin flexible material is a waste receptacle such as a plastic bag. It will be understood by one skilled in the art that all materials will break under a certain strain or load. For purposes of the disclosure, "without shearing" means not shearing the thin flexible material presuming there is no strain or no load. For example, trash or items placed within a receptacle or bag.

Here, first securing member 12 is a hallow cylinder. Outer circumference 14 is defined by an inner sidewall 16 of the first securing member. Second securing member 20 is a cylinder with a tapered flange 26 at the top of the hallow cylinder. Inner diameter 22 is defined by the outer radius of flange 26. Second securing member is shown hallow with a cavity 24 in this example, but in other examples can be made solid. In this configuration, first securing member 12 is a female receptacle and second member 20 is a male connector. Inner circumference 22 is slightly larger than outer circumference 14 providing an interference fit between the securing members. Making second member from a deformable material allows tapered flange 26 to be deformable. The interference fit between the inner circumference 22, defined by tapered flange 26, and outer circumference 14, defined by the inner sidewall 16, allows sufficient static friction to secure the flexible material and prevents the flexible material from shearing. An interference fit between deformable material can be beneficial for securing thin flexible materials such as plastic bags. While this example shows an interference fit, an interference fit is not necessary. One skilled in the art will understand that the inner circumference and the outer circumference size and shape will vary depending on the application. Depending on the application, the flexible material may be thicker or thinner.

Other features include a tab 19 on first member 12 that allows convenient finger access to position first securing member 12 onto second securing member 20 as well as removing first securing member 12 from second securing member 20. A flat flange 28 extrudes radially from the second securing member between tapered flange 26 and backing support 18. Flat flange 28 provides a stop for first securing member 12 preventing. A hinge 30, here attached to flat flange 28 connects first member 12 and second member 20. In this embodiment, both the first shape and second shape are the same and circular, and rotation reference is not required, although in other embodiments other shapes, described in further detail hereinbelow, can be implemented. In such embodiments rotational reference can be provided by the hinge. In some configurations the apparatus can provide audible sound that conveys successful positioning of the first member in relation to the second member.

Figure 2:
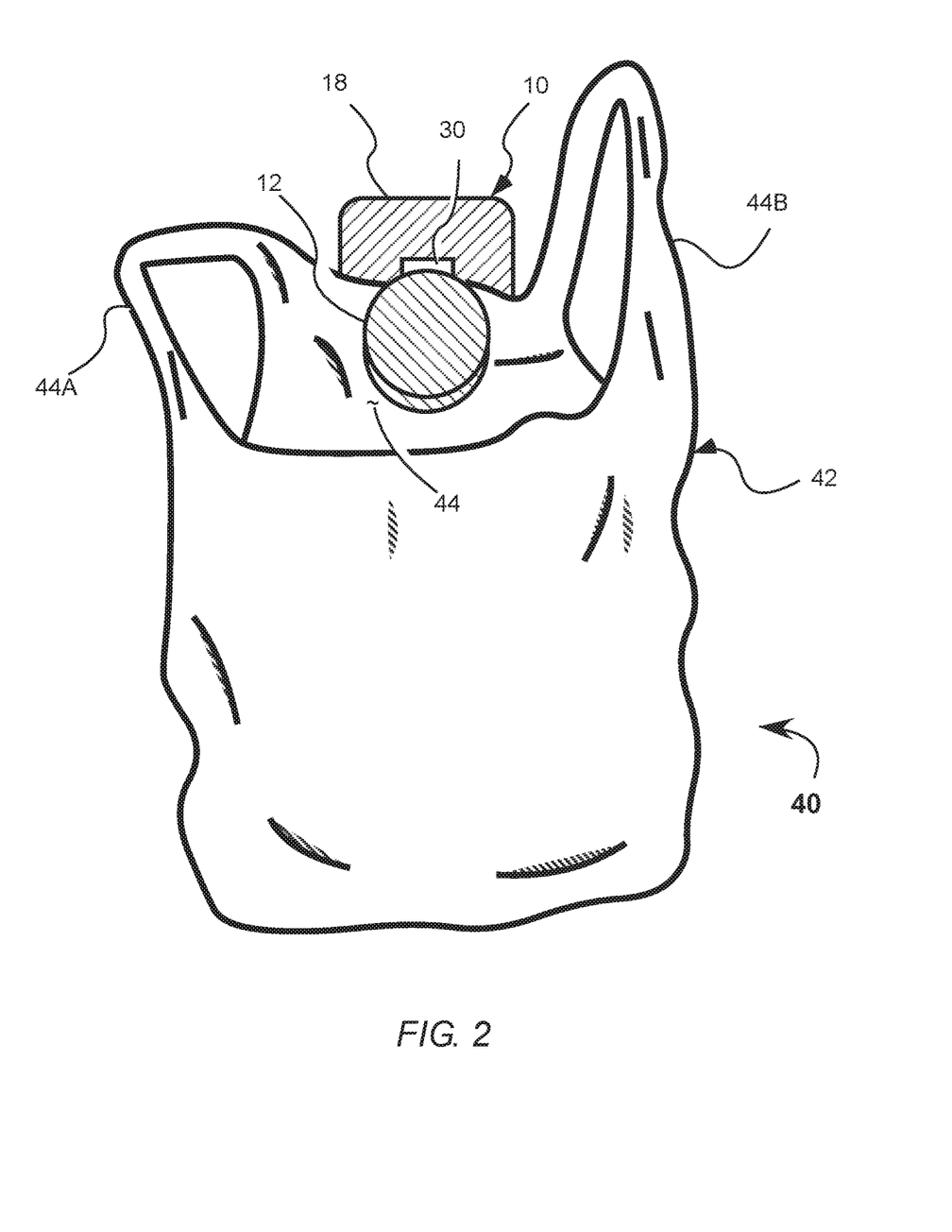
FIG. 2 is a plan view of that seen in FIG. 1A wherein, the thing flexible material, here a waste bag, is placed between the first member and the second member, shown securely immobilized.

Referring to FIG. 2, a plan view shows an apparatus 40 having that shown in FIG. 1A with a thin flexible material 42 placed between first member 12 and second member 20. Here, thin flexible material 42 is a waste bag with a looped handle 44A and a looped handle 44B. The waste bag is secured by positioning thin flexible material 42 between first member 12 and second member 20 and pressing the two members together thereby creating the static friction. The static friction between the first outer circumference and the second inner circumference secures and immobilizes the thin flexible material contained within without shearing through the material.

Although, the waste bag shown has handles, one skilled in the art can easily see that the apparatus can be used with any type of plastic bag, waste bag or other flexible container such as a cloth or mesh tote bag. By using the top portion of the waste bag, placing items or waste within the waste bag encourages the waste bag to remain open allowing access. In the current illustrated examples, conveniently, both looped handle 44A and 44B are left free and accessible to aid in the installation or removal of the waste bag. In cases where a receptacle is expected to carry a heavy load, and the thin flexible material is susceptible to shearing or stretching, the thin flexible material can be folded upon itself when placed between first securing member 12 and second securing member 20.

The apparatus is preferably mounted onto, or incorporated as part of, a larger structure, which for purposes of the present disclosure is termed a substrate. The substrate can be virtually any structure including interior or exterior walls, house furnishing, land vehicles (including a car, truck, bus, or recreational vehicle), water vehicles, or aircraft. The apparatus can be mounted with adhesive, mechanical, or other such means. Adhesives include temporary removable adhesive strips, air-dry glue, 2-part epoxy, UV activated glue, and pressure activated glues. The backing material can include thru-holes for mechanical means include screws and bolts, or incorporate clips, hooks, or other mechanical mounting features. Other means include magnetism, suction cups, or Velcro.

The apparatus described above, and those described below, can be made from a variety of materials and manufactured by a variety of processes. In general, the apparatus can be made from any type of plastic, wood, or metal and optionally finished with surface coatings or texturing. In some examples, hybrids are used wherein the first member, the second member, or the backing material are made from different materials either for physical or aesthetics purposes. For instance, the first member can be made from metal and the second member can be made from plastic or vice versa. Alternatively, the backing material can be can be made with a material to aesthetically match a vehicle interior, house furnishing or fixtures.

The apparatus can be manufactured by any means including handcrafted, machined, molded, 3D printed, or combinations thereof. Plastic injection molding is particularly well suited for manufacturing the apparatus in volume. For instance, the apparatus 10 shown in FIG. 1A and FIG. 1B is well suited for monolithic manufacture via additive printing or plastic injection molding. Suitable plastics (or polymers) materials include ABS, ABS/PC, CPVC, ETPU, HDPE, LCP, LDPE, LLDPE, PA, PBT, PC, PC/PBT, PEEK, PEI, PET, PETG, PMMA, POM, PP, PPE/PS, PPSU, PS, PSU, PTFE, PVC, SB, and UHMW.

In one such embodiment similar to that shown in FIG. 2, the apparatus was made from a polymer. The first securing member and the second securing member had a diameter of about 1" and height from the backing material was about ½". A ¾ mil plastic bag was positioned between the first and second member and secured by positioning the first securing member and second securing member together to create static friction. The bag was not sheared. The bag was gradually filled and held 15 lbs of weight before failure of the plastic bag.

Various examples of embodiments in accordance with the present disclosure are provided herein below.

Figure 3A:
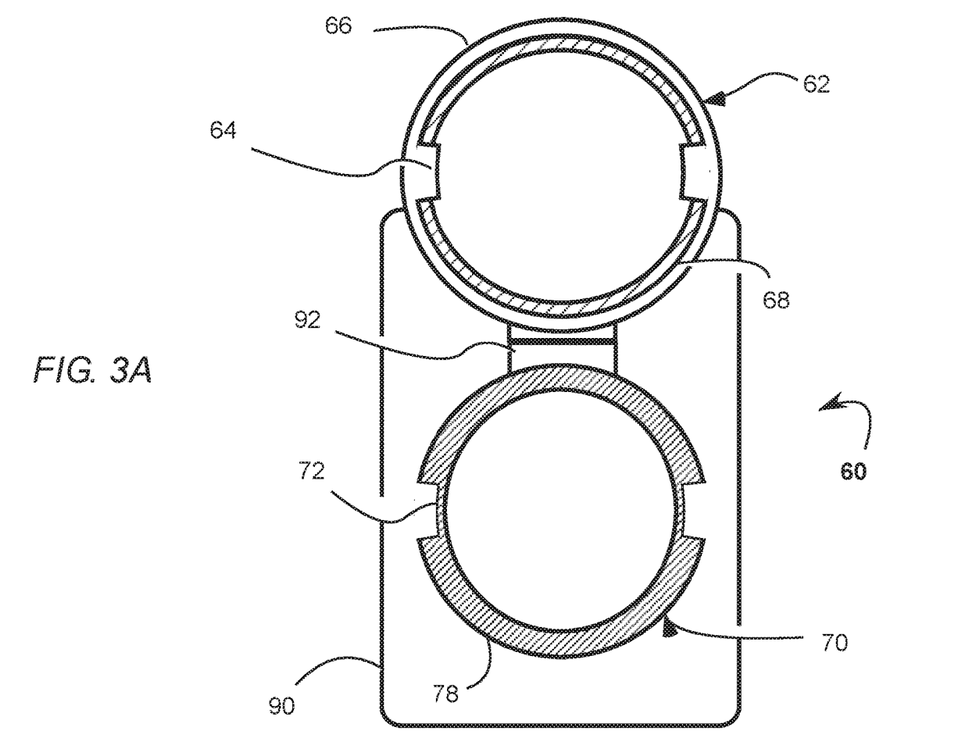
FIG. 3A is a plan view of another apparatus of the present disclosure, wherein the first member has a reference member and the second member has an opening and index position for the reference member wherein rotational positioning of the first member relative to the second member draws the first member toward the second member and indexes the reference member and creates static friction between the first and second member.
Figure 3B:
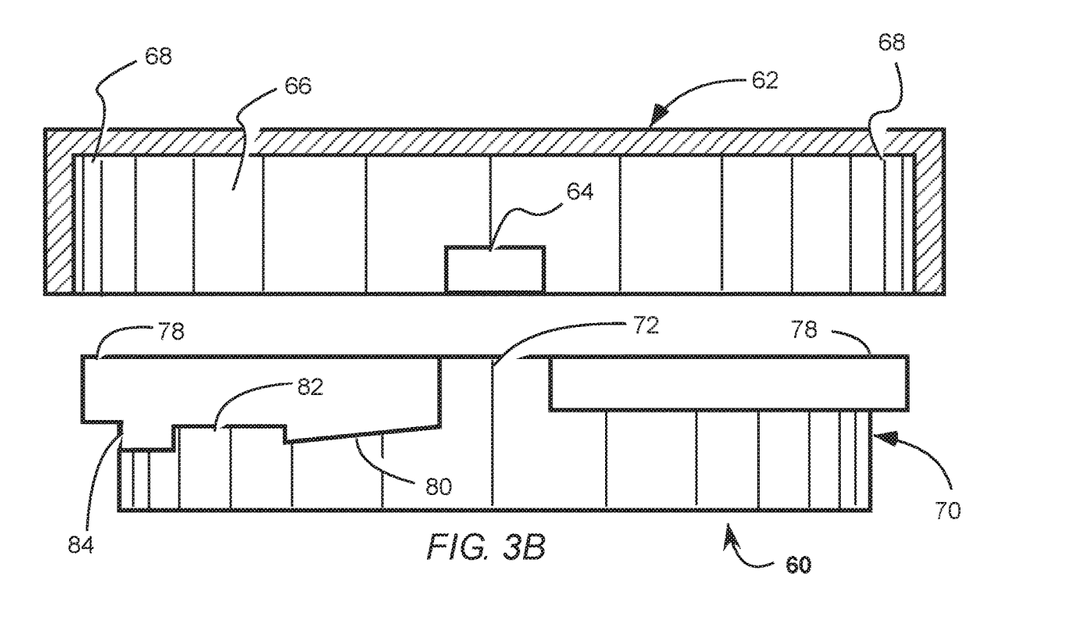
FIG. 3B is an orthogonal view, partly in cross-section, of that seen in FIG. 3A, providing further detail of the first member and the second member.

Referring to FIG. 3A and FIG. 3B, an apparatus 60 has a first securing member 62 and a second securing member 70 attached, the second securing member physically connected to a backing material 90. A hinge 92 connects the first securing member to the second securing member and provides rotational freedom of the first member relative to the second member. First securing member 62 has a reference member 64 attached to a cylindrical sidewall 66. The reference member protrudes inwardly from the cylinder. An inner circumference 68 is defined by a single cross-hatched area illustrated on first securing member 62. Second securing member 70 has an opening 72 wherein reference member 64 fits within. An outer circumference 78 is defined by a double cross-hatched area illustrated on the second securing member.

Referring to FIG. 3B in particular, positioning the first securing member down upon the second securing member with the reference member and the opening aligned allows the reference member to pass through the opening. Rotation of the first member relative to the second member draws the first member upon the reference member sliding along a ramp 80. The reference member falls into an index 82 and is stopped from further rotation by a stopping block 84. Drawing the first member and the second member together and indexing the reference member creates and sustains a static friction between the inner circumference 68 and outer circumference 78, thereby securing and immobilizing any flexible thin material placed between.

Figure 4:
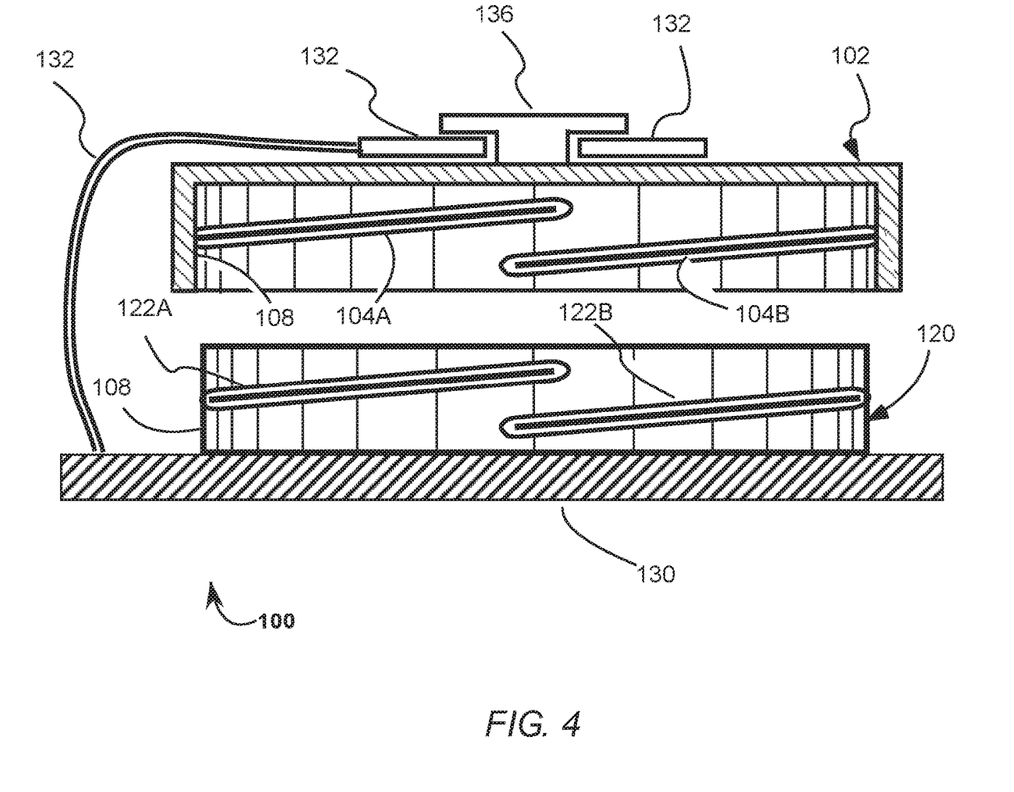
FIG. 4 is a cross-section view of yet another apparatus of the present disclosure, wherein the first member and the second member have threads.

Referring to FIG. 4, an apparatus 100 has a first securing member 102 and a second securing member 120. Second securing member 120 is attached to a backing material 130. A hinge 132 is secured to backing material 130 and attached to first securing member 102 by a mounting feature 136 that allows rotational freedom. First securing member 102 has a series of threaded features including a thread 104A and a thread 104B shown. Second securing member 120 also has a series of threaded features with a thread 122A and a thread 122B shown. The first securing member's threads and the second securing member threads are complimentary and upon positioning and rotation, draw the first member and the second member together, thereby creating a static friction between an inner circumference 128 and an outer circumference 108.

Figure 5A:
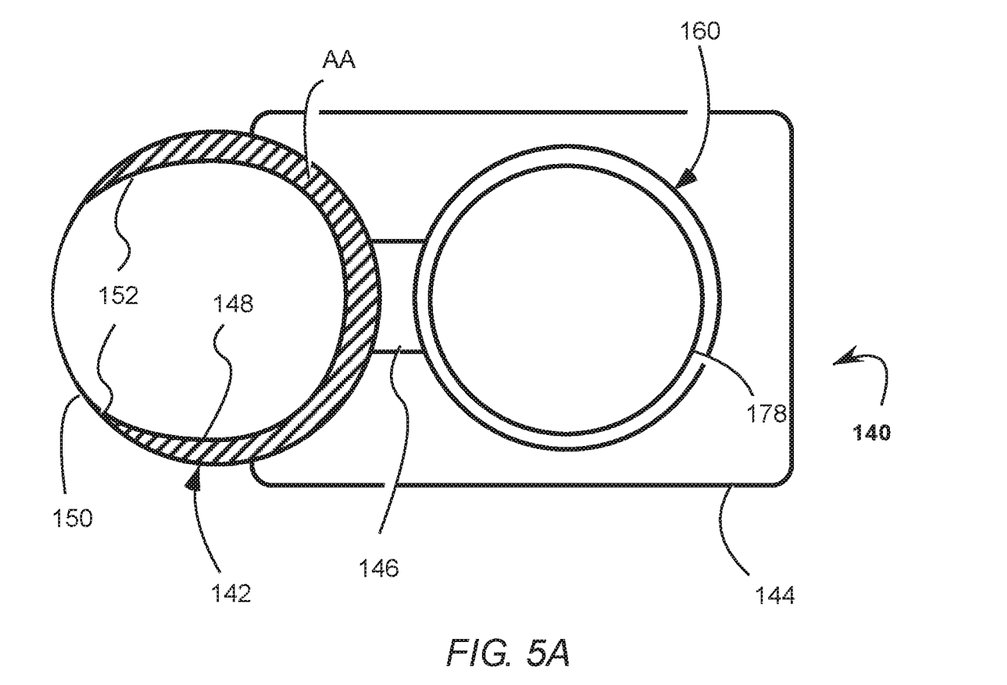
FIG. 5A is a plan view of yet another apparatus of the present disclosure, wherein the first securing member drawn over the second securing member creates static friction.
Figure 5B:
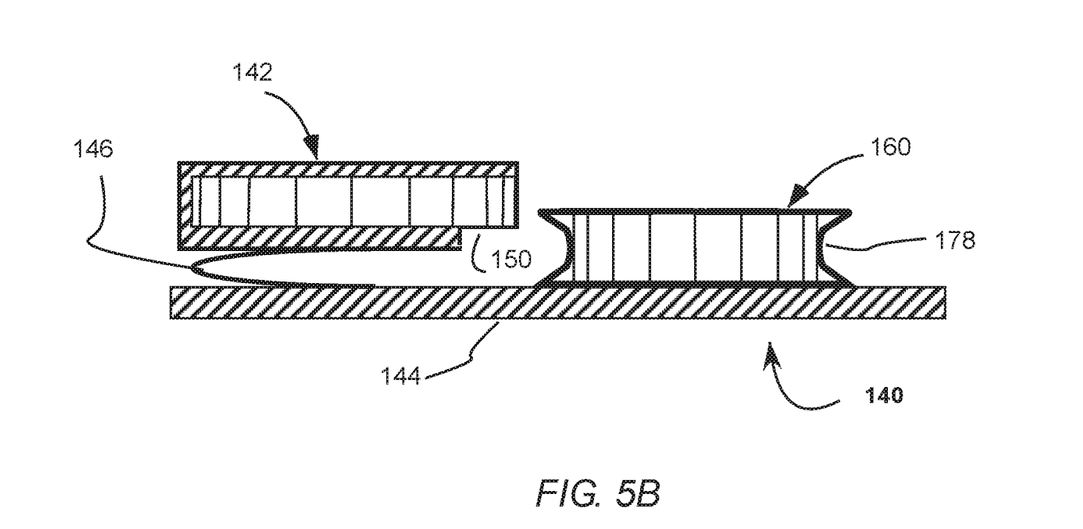
FIG. 5B is a cross-section view of that seen in FIG. 5A, providing further detail of the yet another apparatus.

Referring to FIG. 5, an apparatus 140 has a first securing member 142 and a second securing member 160. First member 142 is attached to a backing material 144 by a flexible hinge 146. Second member 160 is attached to backing material 132. The first members shape has an outer circumference 148 defined by a shelf that resides at the bottom of the hollowed cylindrical first securing member. Outer circumference 148 has a semi-circular first shape that has an opening 150 as a result of a tapered end 152 of the semi-circular first shape. Second member 160 is a solid tapered cylindrical piece, with an inner circumference 178 defined by the narrowest cross-section of the cylinder, wherein the tapered cylinder increases in circumference on either side of the inner circumference.

Operationally, the thin flexible material is place over the top of second securing member 160 and first securing member 142 is drawn over the second securing member by moving the first securing member orthogonal to the second securing member's cylindrical axis with the inner circumference and outer circumference aligned. Moving the members in this manner deforms at least the tapered ends 152 and allows the outer circumference to overlap and partially enclose the inner circumference to create the static friction.

Figure 6A:
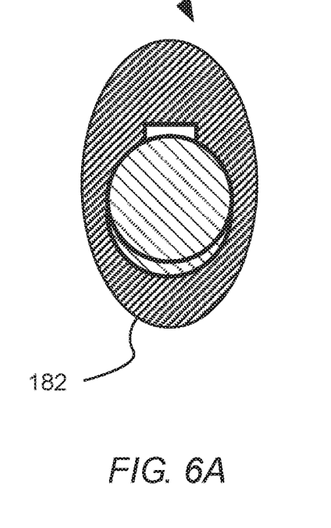
FIG. 6A is a plan view of an apparatus of the present disclosure, wherein the backing is oval.
Figure 6B:
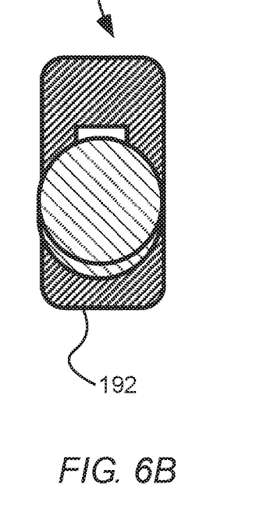
FIG. 6B is a plan view of an apparatus of the present disclosure, wherein the backing has the same footprint as the second securing member.
Figure 6C:
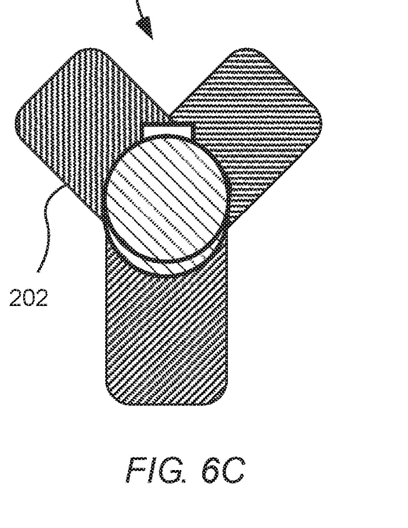
FIG. 6C is a plan view of an apparatus of the present disclosure, wherein the backing is Y-shaped.
Figure 7A:
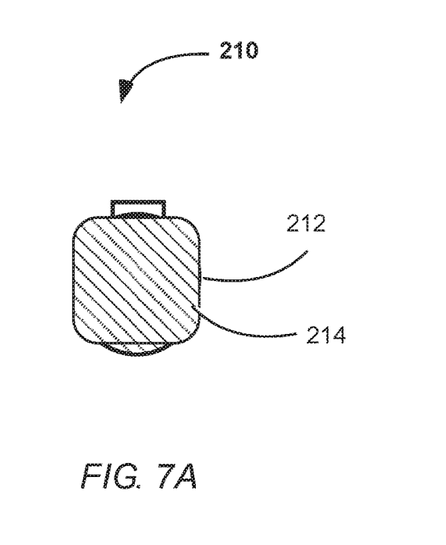
FIG. 7A is a plan view of an apparatus of the present disclosure, wherein the first shape is square with rounded corners
Figure 7B:
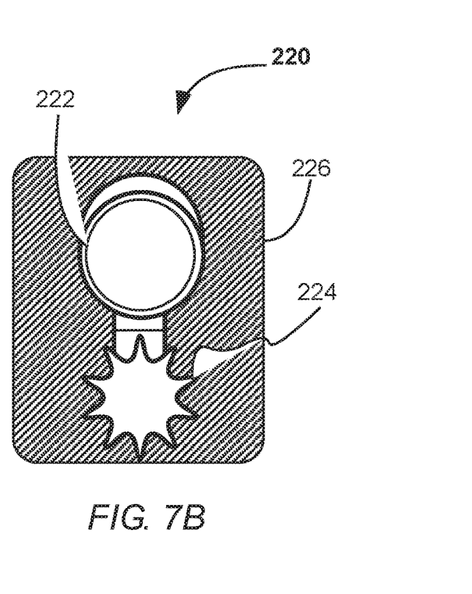
FIG. 7B is a plan view of an apparatus of the present disclosure, wherein the first shape and the second shape are different.

It will be recognized to those skilled in the art that a variety of other geometries and shapes can used for the first securing member, second securing member, and backing material. For instance, the backing material can be larger or smaller dependent on the application and load. The backing material can have the same footprint as the first or the second member. Various geometries for the backing material can be used. Referring to FIG. 6A, FIG. 6B, and FIG. 6C, various geometries of backing are shown with the first and second member of that shown in FIG. 1A. FIG. 6A shows an apparatus 180 with an oval backing 182. FIG. 6B shows an apparatus 190 with a rectangular backing 192 that has the same width as the first and the second member. FIG. 6C shows an apparatus 200 with a Y-shaped backing 202. Similarly, the first and second member can be different sizes and geometries either for aesthetics or for the requisite static friction required according to the application load. Referring to FIG. 7A, an apparatus 210 has first securing member 212 and second securing member 214 that are square shaped with rounded corners. This shape, among other geometries are suitable for the same mechanisms described in FIG. 1A and FIG. 5A. Referring to FIG. 7B, an apparatus 220 has a first securing member 222 and a second securing member 224 attached to a backing material 226. Here the first securing member has a round shape and the second securing member has a 10-pointed star shape, the point of the star defining the first inner circumference.

From the description of the present invention provided herein one skilled in the art can manufacture the apparatus and practice the methods in accordance with the present disclosure. Those skilled in the art to which the present invention pertains will recognize that while above-described embodiments and method of manufacture are exemplified using particular materials, others may be combined using these embodiments without departing from the spirit and scope of the present invention. Although some of the embodiments explained above have certain symmetry one skilled in the art will recognize that such symmetry is not a requirement. In summary, the present invention is described above in terms of particular embodiments. The invention, however, is not limited to the embodiments described and depicted herein. Rather, the invention is limited only by the claims appended hereto.

What is claimed is:

1. A method of securely holding a thin flexible material comprising:
    providing an apparatus with a first securing member having an outer circumference and a first shape, a second securing member having an inner circumference and a second shape, the inner circumference having a tapered flange, wherein the second inner circumference is about the same size, or slightly smaller than, the first securing member's first outer circumference, such that the second securing member positioned upon the first securing member creates static friction between the outer circumference and the inner circumference, and a backing support that is in physical connection with, or incorporated as part of, either the first member or the second member;
    placing a thin flexible material placed between the first securing member and the second securing member; and
    securely positioning the first securing member and second securing member together to create the static friction such that the flexible material is immobilized and not sheared.

2. The method of claim 1, wherein the thin flexible material is a waste bag.

3. The method of claim 1, wherein the thin flexible material is double folded before position between the first securing member and the second securing member.

4. The method of claim 1, wherein the first securing member's first shape is cylindrical.

5. The method of claim 1 wherein the first securing member and the second securing member are the same shape.

6. The method of claim 1, wherein the first securing member is a female receptacle and the second securing member is a male connector.

7. The method of claim 1, wherein the first securing member and the second securing member are positioned by turning the first securing member relative to the second securing member.

8. The apparatus of claim 7, wherein the first securing member and the second securing member are threaded.

9. The method of claim 7, wherein the first securing member has a reference member and the second securing member has an opening and index position, wherein the reference member fits with the opening and wherein rotational positioning of the first securing member relative to the second securing member draws the first securing member toward the second securing member and indexes the reference member and creates static friction.

10. The method of claim 9, wherein the second securing member has a stopping block and an index that is 90 degrees from the opening relative to the center of the second securing member.

11. The method of claim 1, wherein the first securing member's first shape is a hallow cylinder with the outer circumference defined by a shelf with an open end, the second securing member's second shape a solid tapered cylinder wherein the second inner circumference is defined by the area having the narrowest cross-section of the tapered cylinder with increasing circumference on either side of the second inner circumference, wherein the first circumference can be drawn over the second circumference by moving the first securing member orthogonal to the second securing member's cylindrical axis, wherein the first securing member deforms to allow the first outer circumference to overlap and partially enclose the second inner circumference to create static friction.

12. The method of claim 1, further comprising the step of mounting the apparatus onto a substrate.

13. The method of claim 12, wherein the apparatus is mounted with adhesive layer that is attached to the backing material, the adhesive allowing attachment of the backing material to a substrate.

14. The method of claim 13, wherein the adhesive is temporary and removable.

15. The method of claim 12, wherein the backing support has thru-holes for mounting.

16. The method of claim 1, wherein the apparatus is a monolithic structure.

17. The method of claim 1, wherein the apparatus is made from materials comprising plastic, wood, metal, or combinations thereof.

18. The apparatus of claim 1, wherein the backing support is incorporated as part of another apparatus.

* * * * *